J. LEE,

Assignor to the HALE & KILBURN MANUFACTURING CO.

Convertible-Chair.

No. 8,604. Reissued Mar. 4, 1879.

Witnesses.
A. Ruppert.
J. G. Mason

James Lee
Inventor.
D. P. Holloway & Co
Attys

N. PETERS, PHOTO-LITHOGRAPHER, WASHINGTON, D. C.

UNITED STATES PATENT OFFICE.

JAMES LEE, OF NEW YORK, N. Y., ASSIGNOR TO THE HALE & KILBURN MANUFACTURING COMPANY, OF PHILADELPHIA, PENNSYLVANIA.

IMPROVEMENT IN CONVERTIBLE CHAIRS.

Specification forming part of Letters Patent No. 91,350, dated June 15, 1869; Reissue No. 7,970, dated November 27, 1877; Reissue No. 8,604, dated March 4, 1879; application filed May 7, 1878.

*To all whom it may concern:*

Be it known that I, JAMES LEE, of New York, in the county of New York and State of New York, have invented a new and Improved Combined Child's Chair and Carriage; and I do hereby declare that the following is a full, clear, and exact description thereof, which will enable others skilled in the art to make and use the same, reference being had to the accompanying drawings, forming part of this specification, in which—

Figure 1:
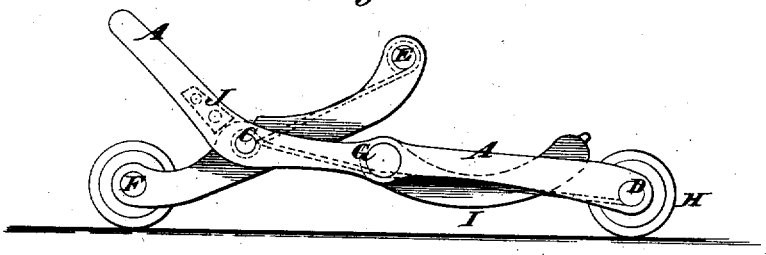
Figure 2:
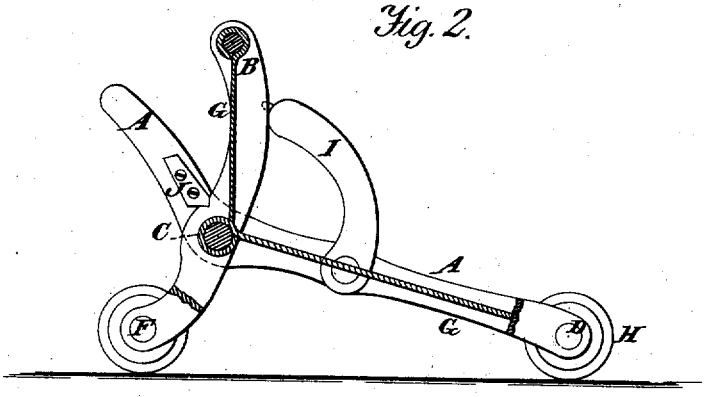
Figure 3:
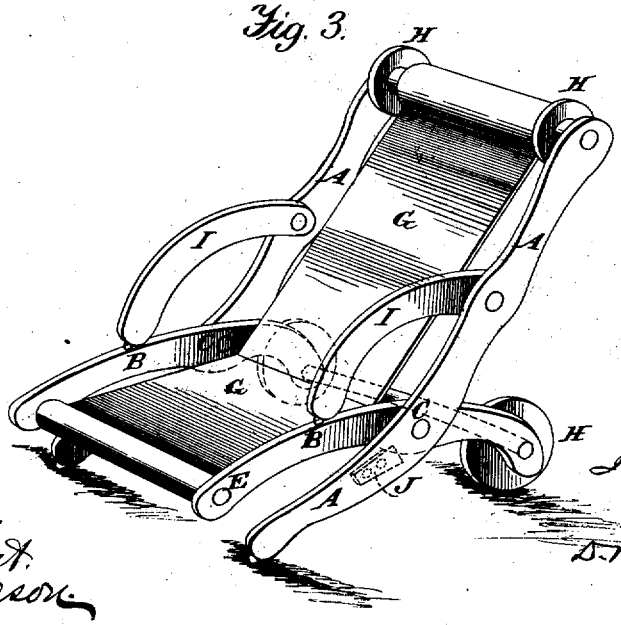

Figure 1 is a side view of my improved chair and carriage, showing an arrangement for use as a wagon. Fig. 2 is a side view of the same arranged for use as a wagon or wheelbarrow, part being broken away to show the construction. Fig. 3 is a perspective view of the same arranged for use as a chair.

The same letters are used in all the figures in the indication of identical parts.

This invention has for its object a child's convertible chair and carriage, affording supports for the child of different heights, and shiftable, so that in different positions it may stand on legs or rest on wheels, on which it may be trundled as a carriage or barrow; and to this end it consists in forming the frame of parts pivoted in such manner as to permit the frame to be expanded and contracted, the degree of expansion being limited by stops which hold the parts in a defined relation to one another.

It consists in the construction and combination of the various parts, as hereinafter more fully described.

A are bars, the upper parts of which form the side rails of the chair-back, and the lower parts of which form the fore legs of the chair, or the handle for propelling it, according as the device is to be used as a chair or wagon. B are bars, the upper parts of which form the side bars of the chair-seat, and the lower parts of which form the rear legs of the chair. C is a round or cross-bar, which passes through the bars A and B at their points of intersection, and thus pivots the said bars to each other. The upper ends of the bars A, the upper ends of the bars B, and the lower ends of the said bars B are also connected by rounds or cross-bars D E F, respectively, as shown in Fig. 3. The lower ends of the bars A may also be connected by a round or cross-bar, if desired.

G is the back and seat of the chair, which I prefer to make of cloth, and which passes around and is secured to the three rounds E C D, as shown in Figs. 1, 2, and 3. H are wheels, which work upon journals formed upon rounds or cross-bars D and F, and upon which the chair is supported when adjusted as a wagon or barrow, as shown in Figs. 1 and 2.

I are arms, one end of each of which is pivoted to the side bars A, and their other ends are provided with tenons or pins, which enter sockets or holes in the bars B, as shown in Figs. 2 and 3.

When the chair is adjusted for use as a chair, the arms I serve as chair-arms simply; but when the chair is adjusted for use as a wagon, the arms I serve as braces to support the upper parts of the bars B and hold them in place, as shown in Fig. 2.

In the adjustment shown in Fig. 1, the arms I are not used, and may be turned down out of the way, as shown. When the chair is adjusted in the manner shown in Fig. 2, by raising the rear part by means of the handles, so that the forward wheels alone may rest upon the floor, the said chair is converted into a wheelbarrow.

J are blocks, attached to the bars A, to serve as stops and supports when the chair is adjusted into the form shown in Figs. 1 and 3, while the braces I serve as stops to hold the parts in the position shown in Fig. 2.

It will be observed that the wheels, instead of being caster-wheels, such as are usually attached to chairs, &c., are hung on fixed axles, so that they restrict the normal movement to right lines, which is necessary in order to carry out the analogy to a carriage which it is desirable to maintain. My invention is also distinguishable from what have been known in this, that these wheels are attached to legs capable of adjustment by extending the base of the frame, as shown in two positions, Figs. 2 and 3; also in this, that the wheels are attached to the rounds or cross-bars, and the latter are then made to perform the double function of stretchers and axles.

What I claim as my invention, and desire to secure by Letters Patent, is—

1. The combination, in a convertible chair and carriage, of the cross-bars A and B, pivoted together at C, wheels H H, mounted on fixed axles on the respective bars, and stops for supporting the bars at varying angles of inclination, substantially as set forth.

2. A convertible chair and carriage embracing in its construction bars A and B, adjustable in relation to one another, and wheels running on fixed axles, which restrict their motion normally to right lines, so as to form a carriage when extended, substantially as set forth.

3. In a convertible chair and carriage, in combination with the wheels, stretchers which perform the double function of axles for the wheels and stretchers for holding the parts in place, substantially as set forth.

In testimony that I claim the foregoing I have hereunto set my hand this 18th day of March, 1878.

JAMES LEE.

Witnesses:
K. NEWELL,
JAMES H. HUNTER.